United States Patent
Brown

(10) Patent No.: US 10,040,384 B2
(45) Date of Patent: Aug. 7, 2018

(54) TWIST-LOCK ARTICULATING ASSIST MECHANISM

(71) Applicant: GM GLOBAL TECHNOLOGY OPERATIONS LLC, Detroit, MI (US)

(72) Inventor: David L. Brown, White Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/393,777

(22) Filed: Dec. 29, 2016

(65) Prior Publication Data

US 2018/0186264 A1  Jul. 5, 2018

(51) Int. Cl.
*B60N 3/02* (2006.01)

(52) U.S. Cl.
CPC .............. *B60N 3/023* (2013.01); *B60N 3/026* (2013.01)

(58) Field of Classification Search
CPC .......... B60N 3/02; B60N 3/026; B60N 3/023; B65D 25/2835
See application file for complete search history.

(56) References Cited

U.S. PATENT DOCUMENTS

| | | | |
|---|---|---|---|
| 6,467,130 B2* | 10/2002 | Kurachi | B60N 3/023 16/418 |
| 7,017,235 B2* | 3/2006 | Lu | H04M 1/0212 16/280 |
| 7,103,939 B2* | 9/2006 | Belchine, III | B60N 3/023 16/412 |
| 7,383,618 B2* | 6/2008 | Lu | H04M 1/0216 16/303 |
| 7,617,571 B2* | 11/2009 | Lee | B60N 3/023 16/412 |
| 8,146,208 B2* | 4/2012 | Kajio | B60N 3/023 16/444 |
| 8,408,621 B2* | 4/2013 | Kajio | B60N 3/026 16/110.1 |
| 8,661,622 B2* | 3/2014 | Takai | B60N 3/023 16/438 |
| 8,732,911 B2* | 5/2014 | Kajio | B60N 3/023 16/438 |
| 8,875,352 B2* | 11/2014 | Seto | B60N 3/023 16/438 |
| 2005/0091798 A1* | 5/2005 | Belchine, III | B60N 3/023 16/412 |
| 2012/0222360 A1* | 9/2012 | Schryer | B60N 3/026 49/460 |
| 2015/0102620 A1* | 4/2015 | Ichioka | F16F 9/12 296/1.02 |
| 2016/0214520 A1* | 7/2016 | Kajio | B60N 3/023 |
| 2016/0236602 A1* | 8/2016 | Nagayama | B60N 3/023 |
| 2016/0297340 A1* | 10/2016 | Yang | B60N 3/026 |

\* cited by examiner

*Primary Examiner* — Jeffrey O'Brien
(74) *Attorney, Agent, or Firm* — Quinn IP Law

(57) ABSTRACT

An assist mechanism, attachable to a frame, includes an assist bezel and an assist handle. The assist bezel has a clip attachable to the frame. A first arm and a second arm extend from the clip. A first hub is formed on the first arm and second hub is formed on the second arm. A twist-lock housing is defined in the assist handle, and includes a first receptacle configured to retain the first hub and a second receptacle configured to retain the second hub. The first hub of the assist bezel enters the first receptacle via a first ramp and the second hub enters the second receptacle via a second ramp. The assist handle is rotatable about the assist bezel between a plurality of positions.

10 Claims, 3 Drawing Sheets

TWIST-LOCK ARTICULATING ASSIST MECHANISM

INTRODUCTION

This disclosure generally relates to assist mechanisms, assist handles, or grab handles, such as those used in motor vehicles and other transportation means such as airplanes, buses and trains. The assist mechanisms are usable as grab handles for assisting egress and ingress, and may be fully or partially retractable when not in use.

SUMMARY

An assist mechanism is provided. The assist mechanism is attachable to a frame, and includes at least one assist bezel and an assist handle.

The assist bezel has a clip configured to attach to the frame. A first arm extends from the clip and a first hub is formed on the first arm. A second arm also extends from the clip and a second hub is formed on the second arm.

The assist handle has a twist-lock housing defined therein. The twist-lock housing includes a first receptacle configured to retain the first hub of the assist bezel and a second receptacle configured to retain the second hub of the assist bezel. A first ramp is defined adjacent to the first receptacle, such that the first hub of the assist bezel enters the first receptacle via the first ramp, and a second ramp is defined adjacent to the second receptacle, such that the second hub enters the second receptacle via the second ramp.

The first hub and the second hub of the assist bezel pivot within the first receptacle and the second receptacle of the assist handle, such that the assist handle is rotatable about the assist bezel between a plurality of positions. In some configurations, the assist bezel is a one-piece element and the assist handle is a one-piece element. Configurations may also include one of a spring and a damper disposed in a gap defined between the first arm and the second arm of the assist bezel.

The above features and advantages, and other features and advantages, of the present subject matter are readily apparent from the following detailed description of some of the best modes and other embodiments for carrying out the disclosed structures, methods, or both.

DETAILED DESCRIPTION

Figure 1:
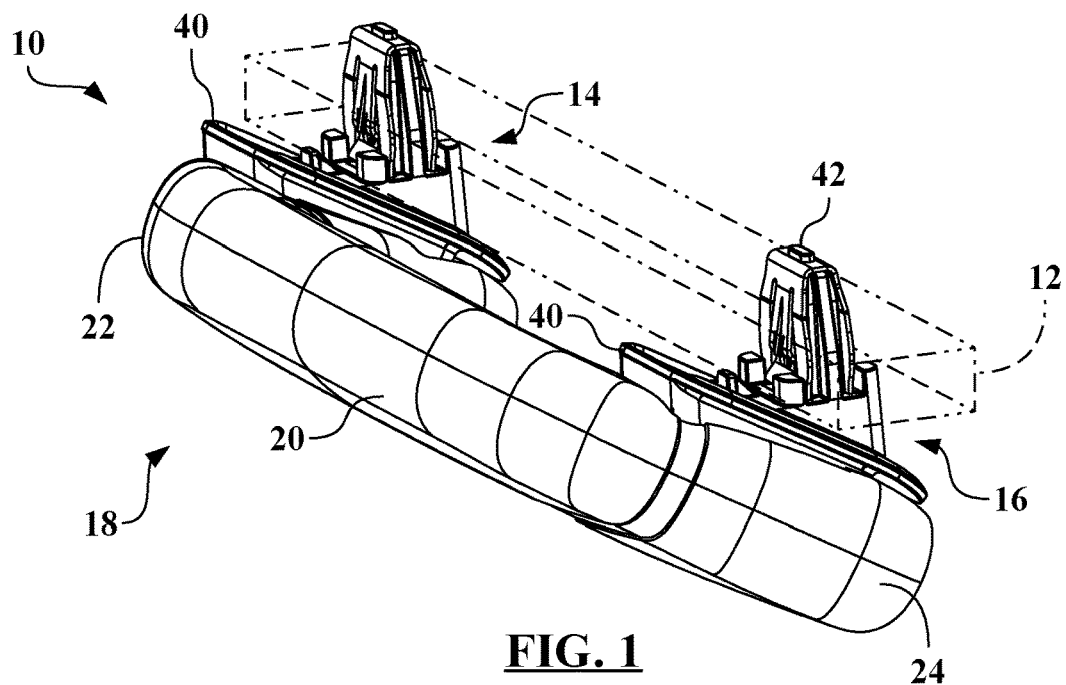
FIG. 1 is a schematic isometric view of an assist mechanism, such as may be used within vehicles, with an assist handle shown in a closed or stowed position.

In the drawings, like reference numbers correspond to like or similar components whenever possible throughout the several figures. There is shown in FIG. 1 and FIG. 2 a schematic isometric view of an assist mechanism 10, such as may be associated with a vehicle (not shown).

Figure 2:
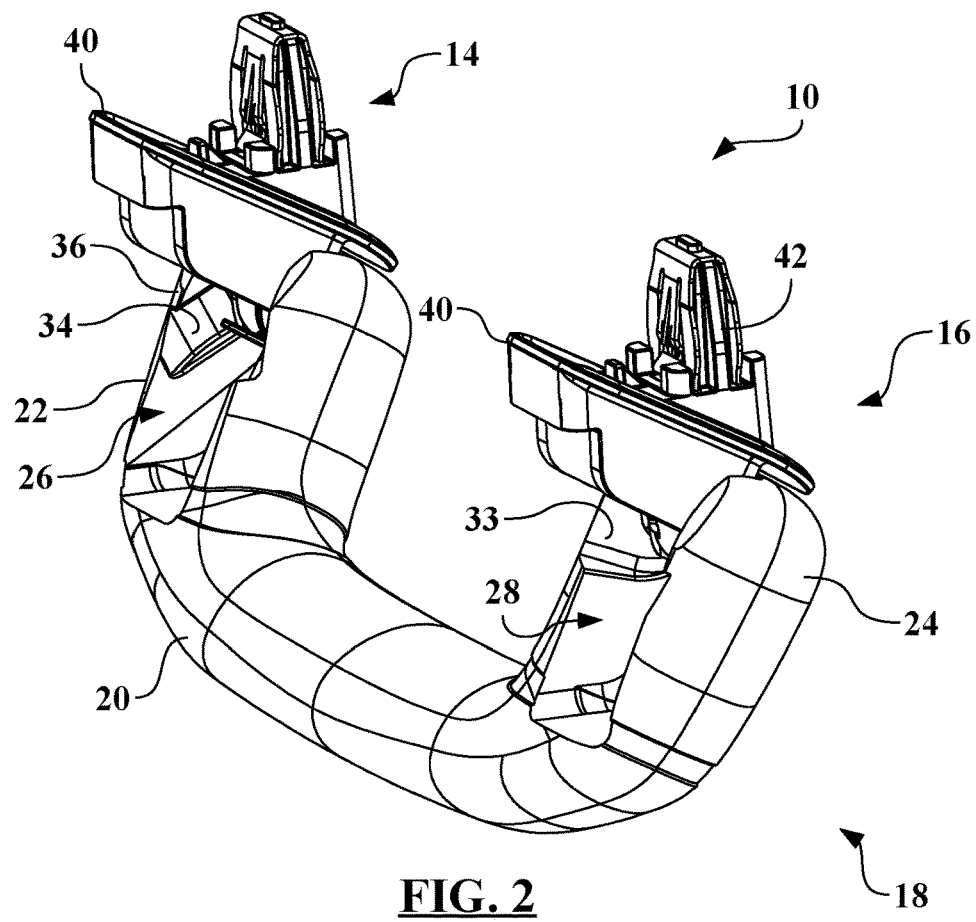
FIG. 2 is a schematic isometric view of the assist mechanism of FIG. 1, with the assist handle shown in an open or deployed position, and illustrating a pair of handle bezels or hinges usable to attach the assist handle to a vehicle or other structure.

The assist mechanism 10 is shown in a closed or stowed position in FIG. 1, and is shown in an open or deployed position in FIG. 2. The assist mechanism 10 attachable to a frame 12 of the vehicle. The frame 12 is illustrated schematically in phantom lines.

The associated vehicle, and any components incorporated therewith, may be representative of numerous types of vehicles, including planes, trains, automobiles, or any other rolling or movable platform. Additionally, heavy industrial, construction, and mining equipment may incorporate features of the assist mechanism 10 described herein. The assist mechanism 10 may also be incorporated into other structures, such as within residential, commercial, or industrial buildings. For example, the assist mechanism 10 may be useful to improve ergonomics of office or food service environments, such as by improving egress and ingress from office chairs or restaurant seating.

While the present disclosure may be described with respect to specific applications or industries, those skilled in the art will recognize the broader applicability of the disclosure. Those having ordinary skill in the art will recognize that terms such as "above," "below," "upward," "downward," et cetera, are used descriptively of the figures, and do not represent limitations on the scope of the disclosure, as defined by the appended claims. Any numerical designations, such as "first" or "second" are illustrative only and are not intended to limit the scope of the disclosure in any way.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

As shown in FIGS. 1 and 2, the assist mechanism 10 is attachable to the frame 12 with a first assist base or bezel 14 and a second assist base or bezel 16. An assist bar or assist handle 18 is rotatably attached to the first assist bezel 14 and the second assist bezel 16, and rotates between a plurality of positions relative to the first assist bezel 14 and the second assist bezel 16, including at least the stowed position shown in FIG. 1 and the deployed position shown in FIG. 2. Therefore, the assist handle 18 is also rotatable or movable relative to the frame 12.

In many configurations, the frame 12 to which the assist mechanism 10 is attached will have additional features or structures, such as padding or upholstery surrounding the frame 12 and abutting the first assist bezel 14 and the second assist bezel 16. However, the frame 12 shown in FIGS. 1 and 2 is illustrated on schematically. Where the assist mechanism 10 is incorporated into a vehicle, the frame 12 may be a portion of the roof above one of the doors of the vehicle, such as between the A-pillar and B-pillar or between the B-pillar and C-pillar.

A bar 20 spans between the first assist bezel 14 and the second assist bezel 16 and may generally be used to provide support for passengers or operators of the vehicle into which the assist mechanism 10 is incorporated. The bar 20 of the assist handle 18 has a first end 22, to which the first assist bezel 14 is operatively attached, and a second end 24, to which the second assist bezel 16 is operatively attached. Individual portions of the first assist bezel 14 and the second assist bezel 16 may be referred to or identified as first and second.

Figure 3:
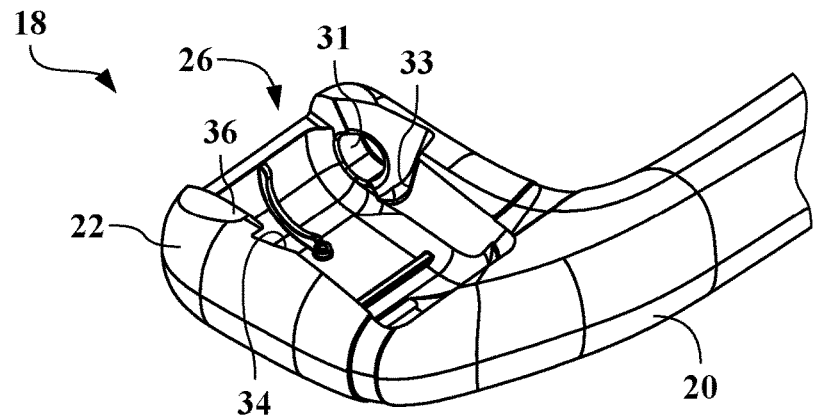
FIG. 3 is a schematic isometric view of a twist-lock housing formed in the assist handle, showing a first side having a first ramp.
Figure 4:
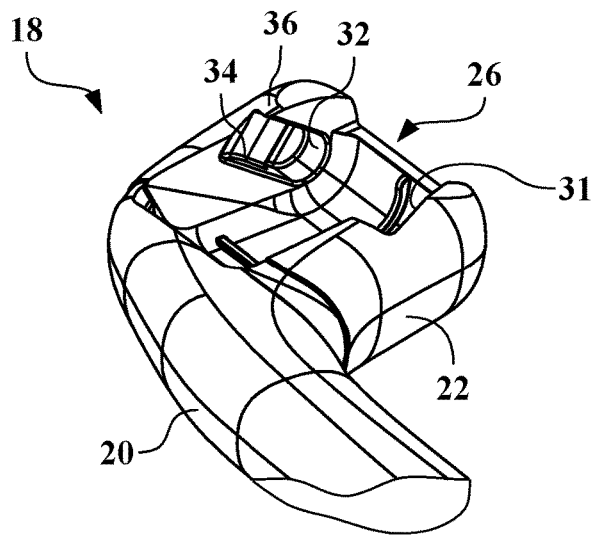
FIG. 4 is a schematic isometric view of the twist-lock housing formed in the assist handle, showing the first side also having a second, covered ramp.
Figure 5:
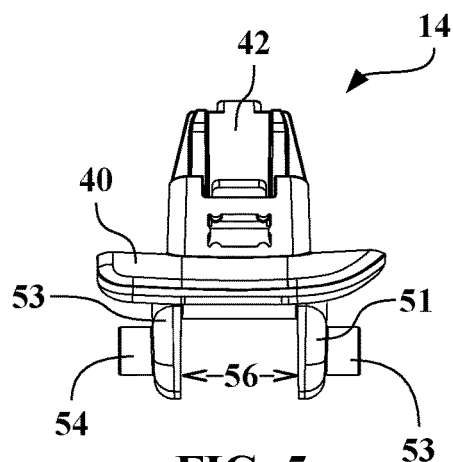
FIG. 5 is a schematic top view of one of the handle bezels, which holds the handle to portions of the vehicle or other structure.

Referring now to FIGS. 3-5, and with continued reference to FIGS. 1 and 2, there are shown views of the components of the assist mechanism 10. FIG. 3 shows one angle or viewpoint of the first end 22 of the bar 20; FIG. 4 shows another angle or viewpoint of the first end 22 of the bar 20; and FIG. 5 shows a front view of the first assist bezel 14 (or the second assist bezel 16).

As partially illustrated in FIGS. 3 and 4, and in other figures, the bar 20 of the assist handle 18 has a first twist-lock housing 26 and a second twist-lock housing 28 (best viewed in FIGS. 2 and 8) defined therein. The first twist-lock housing 26 is viewable from one side in FIG. 3 and is viewable from another side in FIG. 4.

The description herein largely focuses on the first twist-lock housing 26, as the second twist-lock housing 28 shown is substantially similar to the first twist-lock housing 26. Note, however, that other configurations may have different features on the first twist-lock housing 26 and the second twist-lock housing 28, and that (as best viewed in FIG. 8) the second twist-lock housing 28 is mirrored relative to the first twist-lock housing 26.

As best viewed in FIG. 3, the first twist-lock housing 26 of the bar 20 includes a first receptacle 31 and a first ramp 33 defined adjacent to the first receptacle 31. As best viewed in FIG. 4, the first twist-lock housing 26 of the bar 20 also includes a second receptacle 32 and a second ramp 34 defined adjacent to the second receptacle 32.

As will be explained herein, relative to FIGS. 6 and 7, the first receptacle 31 and the first ramp 33, and the second receptacle 32 and the second ramp 34, cooperate to receive the first assist bezel 14 via a twist assembly process. The first assist bezel 14 is initially inserted into the first receptacle 31 via the first ramp 33, and then into the second receptacle 32 via the second ramp 34. As shown in FIGS. 3 and 4, the first twist-lock housing 26 also includes a ramp cover 36, which limits access to the second ramp 34, such that the first assist bezel 14 is first placed into the first receptacle 31.

As shown in FIG. 5, the first assist bezel 14 includes a foot or foundation 40 and a clip 42 extending from the foundation 40. The clip 42 is configured to attach to the frame 12. The foundation 40 may be flush with upholstery or padding attached to the frame 12, such that a portion of the foundation is viewable to occupants of the vehicle, but the clip 42 is not.

In many configurations, the first assist bezel 14 and the second assist bezel 16 may be very similar, if not substantially identical, or may be mirror versions of each other. Therefore, only the first assist bezel 14 is shown in FIG. 5, and although the description herein largely refers to the first assist bezel 14, it applies with equal weight to the second assist bezel 16.

The clip 42 shown in illustrative only, and may include other fastener components or elements, such as springs or retaining members. The clip 42 and the foundation 40 may be considered that same element, as both provide support structure and attachment structure between the first assist bezel 14 and the frame 12.

A first arm 51 extends from the foundation 40, generally in the opposite direction from the clip 42. Similarly, a second arm 52 extends from the foundation 40 or the clip 42. A first hub 53 is formed on the first arm 51, and a second hub 54 is formed on the second arm 52.

A space or gap 56 is defined between the first arm 51 and the second arm 52 of the first assist bezel 14. As shown in FIG. 5, the first hub 53 and the second hub 54 extend from opposite sides of the first arm 51 and the second arm 52. Therefore, the gap 56 is defined inside of the first arm 51 and the second arm 52, and the first hub 53 and the second hub 54 are defined outside of the first arm 51 and the second arm 52. Attachment of the first arm 51 and the second arm 52 to the foundation 40—the arms are cantilevered therefrom—provides some spring force against movement of the first arm 51 and the second arm 52 inward.

Figure 6:
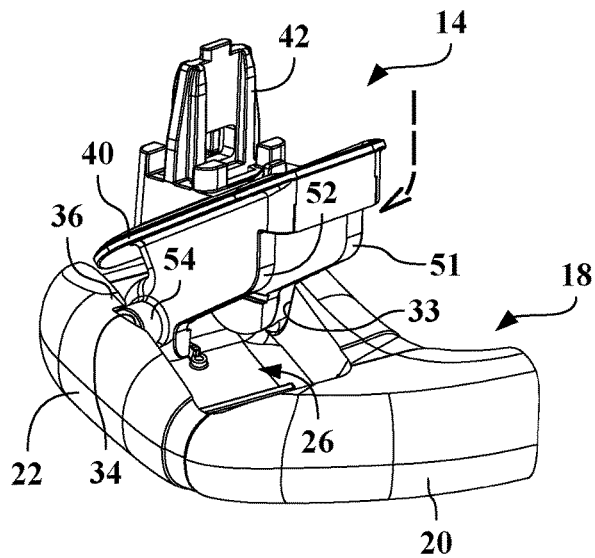
FIG. 6 is a schematic isometric view of the handle bezel being assembled to the twist-lock housing of the assist handle, and shown at an intermediate position.
Figure 7:
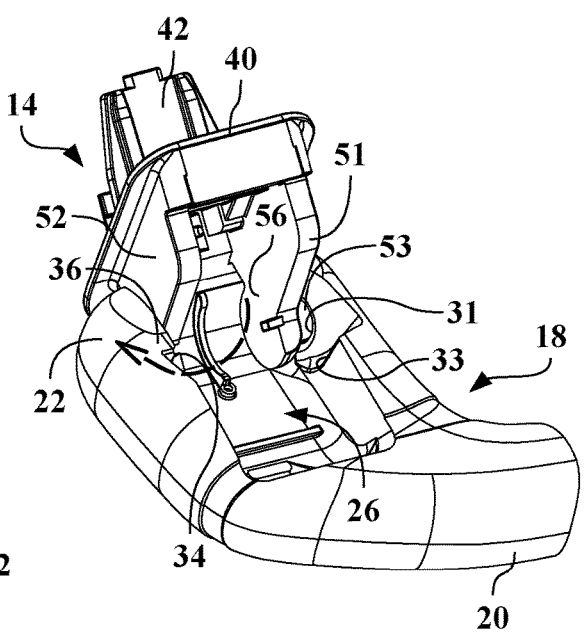
FIG. 7 is a schematic isometric view of the handle bezel being assembled to the twist-lock housing of the assist handle, and shown at a finishing position.

Referring now to FIGS. 6 and 7, and with continued reference to FIGS. 1-5, there are shown additional views of portions of the assist mechanism 10. FIG. 6 shows the first handle bezel 14 during an intermediate position of assembly to the first twist-lock housing 26 of the assist handle 18. FIG. 7 shows the first handle bezel 14 during a substantially final position of assembly to the first twist-lock housing 26 of the assist handle 18.

As shown in FIG. 7, the first receptacle 31 of the first twist-lock housing 26 is configured to retain the first hub 53 of the first assist bezel 14. The first ramp 33 is configured to direct the first hub 53 into the first receptacle 31, such that the first hub 53 enters the first receptacle 31 via the first ramp 33. This is an initial assembly step or position for joining or mating the first assist bezel 14 to the first end 22 of the assist handle 18.

As shown in FIG. 3 and FIG. 6, the first hub 53 enters the first twist-lock housing 26 generally from above (as viewed in the figures). The first ramp 33 directs the first hub 53, and the first arm 51, toward the first receptacle 31. The first hub 53 fits within the first receptacle 31, such that the first assist bezel 14 is loosely held within the first receptacle 31 of the first twist-lock housing 26.

As shown in FIG. 4 and FIG. 7, the second hub 54 enters the second receptacle 32 of the first twist-lock housing 26 generally from the side, as the first assist bezel 14 swings about the first hub 53 and the first receptacle 31. The second receptacle 32 is configured to retain the second hub 54 of the first assist bezel 14, which enters the second receptacle 32 via the second ramp 34. The second ramp 34 has less freedom of movement than the first ramp 33, and has a greater angle, relative to vertical, than the first ramp 33. The ramp cover 36 prevents entry of the second hub 54 from above.

As shown in FIGS. 6 and 7, the first hub 53 is inserted into the first ramp 33 and the first receptacle 31, as an initial step, before the second hub 54 is inserted into the second ramp 34 and the second receptacle 34. The second arm 52 is then able to swing or twist toward the second ramp 34 to move the second hub 54 into the second receptacle 34.

The first hub 53 and the second hub 54 are held within the first receptacle 31 and the second receptacle 33 by spring or biasing force caused by attachment of the first arm 51 and the second arm 52 to the foundation 40. Some flexure may occur between the first arm 51 and the second arm 52 as the first assist bezel 14 is assembled to the assist handle 18 via the twisting motion. However, the configuration shown requires less inward force than non-twist structures or configurations, such as those in which both arms are simultaneously flexed for assembly.

As shown in FIGS. 1 and 2, the first hub 53 and the second hub 54 pivot within the first receptacle 31 and the second receptacle 32. Therefore, the assist handle 18 is rotatable about the first assist bezel 14—and, similarly, about the second assist bezel 16—between the plurality of positions.

In the configuration of the assist mechanism 10 illustrated in the figures, the first assist bezel 14 and the second assist bezel 16 are each formed as one-piece unitary components or elements. Similarly, the assist handle 18 is formed as a one-piece element or structure. One-piece components are formed as a single piece, as opposed to multiple pieces that are subsequently assembled together. Therefore, among other benefits, the opportunity for part errors or stacked variance problems may be reduced relative to multi-piece components. Additionally, the one-piece nature of the first assist bezel 14 and the second assist bezel 16 may provide additional strength to the first arm 51 and the second arm 52, and their connections to the foundation 40.

Figure 8:
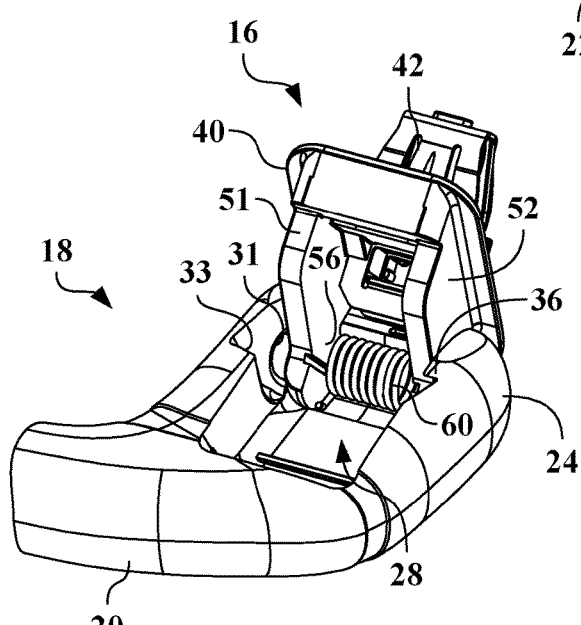
FIG. 8 is a schematic isometric view of a second side of the interface of the handle bezel and the assist handle, shown with a spring or biasing member attached between with the handle bezel and the assist handle.

Referring now to FIG. 8, and with continued reference to FIGS. 1-7, there is shown an additional view of a portion of the assist mechanism 10. FIG. 8 shows the second assist bezel 16 and the second twist-lock housing 28 at the second end 24 of the assist handle 18.

Attachment or assembly of the second assist bezel 16 to the second twist-lock housing 28 is substantially similar to the twist operation illustrated schematically in FIGS. 6 and 7 relative to the first assist bezel 14 to the first twist-lock housing 26. However, as shown by the structures illustrated in FIG. 8, the twist motion is somewhat opposite that of the first assist bezel 14, as the first ramp 33 of the second twist-lock housing 28 faces leftward, as viewed in FIG. 8.

In many configurations, the first assist bezel 14 and the second assist bezel 16 may be very similar, if not substantially identical. Therefore, only the first assist bezel 14 is shown in FIG. 5, and although the description herein largely refers to the first assist bezel 14, it applies with equal weight to the second assist bezel 16.

Note that the first arm 51 and the second arm 52, as well as the first hub 53 and the second hub 54, of the second assist bezel 16 may also be referred to as third and fourth elements, respectively. Similarly, the first receptacle 31 and the second receptacle 32, as well as the first ramp 33 and the second ramp 34, of the second twist-lock housing 28 may also be referred to as third and fourth elements, respectively As illustrated in FIG. 8, the assist mechanism 10 may include one of a spring 60 and a damper (not shown) disposed in the space or gap 56 defined between the first arm 51 and the second arm 52 of either the second assist bezel 16 or the first assist bezel 14. In the configuration partially illustrated in FIG. 8, the second assist bezel 16 has the spring 60 disposed between its first arm 51 and the second arm 52, and the first assist bezel 14 (not shown) has the damper disposed between its first arm 51 and the second arm 52.

The spring 60 provides retraction force to bring the assist handle 18 from the deployed position (shown in FIG. 2) back to the stowed position (shown in FIG. 1). The damper limits the speed with which the spring 60 can retract the assist handle 18 relative to the second assist bezel 16, such that the bar 20 does not aggressively move toward the frame or attached components. As shown in FIGS. 1 and 2, the spring 60 and the damper may be hidden within covers or shielding components.

Additionally, the spring 60 and the damper bias the first arm 51 and the second arm 52 away from one another. Therefore, the spring 60 and the damper spread the gap 56 and assist in retaining the first hub 53 and the second hub 54 within the first receptacle 31 and the second receptacle 32, which helps retain the assist handle 18 to the first assist bezel 14 and the second assist bezel 16.

The detailed description and the drawings or figures are supportive and descriptive of the subject matter discussed herein. While some of the best modes and other embodiments for have been described in detail, various alternative designs, configurations, and embodiments exist.

The invention claimed is:

1. An assist mechanism attachable to a frame, comprising:
   an assist bezel, having:
      a clip configured to attach to the frame;
      a first arm extending from the clip;
      a first hub formed on the first arm;
      a second arm extending from the clip; and
      a second hub formed on the second arm; and
   an assist handle having a twist-lock housing defined therein, the twist-lock housing including:
      a first receptacle configured to retain the first hub of the assist bezel;
      a first ramp defined adjacent to the first receptacle, such that the first hub of the assist bezel enters the first receptacle via the first ramp;
      a second receptacle configured to retain the second hub of the assist bezel;
      a second ramp defined adjacent to the second receptacle, such that the second hub enters the second receptacle via the second ramp; and
      a ramp cover limiting access to the second ramp of the twist-lock housing, wherein the first ramp does not include any ramp cover,
   wherein the assist handle is configured such that attachment of the assist bezel to the twist-lock housing must occur by first inserting the first hub of the assist bezel into the first receptacle of the twist-lock housing and then inserting the second hub of the assist bezel into the second receptacle of the twist-lock housing, and
   wherein the first hub and the second hub of the assist bezel pivot within the first receptacle and the second receptacle of the assist handle, such that the assist handle is rotatable about the assist bezel between a plurality of positions.

2. The assist mechanism claim 1, wherein a gap is defined between the first arm and the second arm of the assist bezel.

3. The assist mechanism of claim 2, wherein the first hub and the second hub extend from opposite sides of the first arm and the second arm, such that the gap is defined inside of the first arm and the second arm and the first hub and the second hub are defined outside of the first arm and the second arm.

4. The assist mechanism of claim 3, wherein the assist bezel is a one-piece element and the assist handle is a one-piece element.

5. The assist mechanism of claim 4, further comprising:
   one of a spring and a damper disposed in the gap defined between the first arm and the second arm of the assist bezel.

6. The assist mechanism of claim 5, wherein the one of the spring and the damper biases the first arm and the second arm away from one another.

7. An assist mechanism attachable to a frame, comprising:
   an assist bezel, having:
      a clip configured to attach the assist bezel to the frame;
      a first arm extending from the clip;
      a first hub formed on the first arm;

a second arm extending from the clip; and
a second hub formed on the second arm; and
an assist bar having a first side and a second side, wherein
a twist-lock housing is defined in the first side of the assist bar, the twist-lock housing including:
a first receptacle configured to retain the first hub of the assist bezel;
a first ramp defined adjacent to the first receptacle, such that the first hub of the assist bezel enters the first receptacle via the first ramp;
a second receptacle configured to retain the second hub of the assist bezel;
a second ramp defined adjacent to the second receptacle, such that the second hub enters the second receptacle via the second ramp; and
a ramp cover limiting access to the second ramp of the twist-lock housing, wherein the first ramp does not include a ramp cover, such that the second hub of the assist bezel must enter the second receptacle after the first hub of the assist bezel enters the first receptacle,
wherein the first hub and the second hub pivot within the first receptacle and the second receptacle, such that the assist bar is rotatable about the assist bezel between at least a deployed position and a stowed position, in which a portion of the assist bar is nearer the frame than in the deployed position.

8. The assist mechanism of claim 7, further comprising:
one of a spring and a damper disposed in the gap defined between the first arm and the second arm of the assist bezel, wherein the one of the spring and the damper biases the first arm and the second arm away from one another.

9. An assist mechanism attachable to a frame of a vehicle, comprising:
a first assist bezel, having:
a first clip configured to attach the first assist bezel to the frame;
a first arm extending from the clip;
a first hub formed on the first arm;
a second arm extending from the clip; and
a second hub formed on the second arm;
a second assist bezel, having:
a second clip configured to attach the second assist bezel to the frame;
a third arm extending from the second clip;
a third hub formed on the third arm;
a fourth arm extending from the second clip; and
a fourth hub formed on the fourth arm; and
an assist bar having a first side and a second side, wherein
a first twist-lock housing is defined on the first side of the assist bar and a second twist-lock housing is defined on the second side of the assist bar,
the first twist-lock housing including:
a first receptacle configured to retain the first hub of the first assist bezel;
a first ramp defined adjacent to the first receptacle;
a second receptacle configured to retain the second hub of the first assist bezel;
a second ramp defined adjacent to the second receptacle; and
a first ramp cover limiting access to the second ramp of the first twist-lock housing, wherein the first ramp of the first twist-lock housing does not include any ramp cover,
the second twist-lock housing including:
a third receptacle configured to retain the third hub of the second assist bezel;
a third ramp defined adjacent to the third receptacle;
a fourth receptacle configured to retain the fourth hub of the second assist bezel;
a fourth ramp defined adjacent to the fourth receptacle;
a second ramp cover limiting access to the fourth ramp of the second twist-lock housing, wherein the third ramp of the second twist-lock housing does not include any ramp cover, and
wherein the first hub and the second hub of the first assist bezel are pivotable within the first receptacle and the second receptacle, and the third hub and the fourth hub of the second assist bezel are pivotable within the third receptacle and the fourth receptacle, such that the assist bar is rotatable about the first assist bezel and the second assist between at least a deployed position and a stowed position, in which a portion of the bar of the assist bar is nearer the frame than in the deployed position, and
wherein the second hub of the first assist bezel must enter the second receptacle after the first hub of the first assist bezel enters the first receptacle of the first twist-lock housing, and the fourth hub of the second assist bezel must enter the fourth receptacle after the third hub of the second assist bezel enters the third receptacle of the second twist-lock housing.

10. The assist mechanism of claim 9, further comprising:
a spring disposed in a gap defined between the first arm and the second arm of the first assist bezel, wherein the spring biases the first arm and the second arm away from one another; and
a damper disposed in a gap defined between the third arm and the fourth arm of the second assist bezel, wherein the damper biases the third arm and the fourth arm away from one another.

* * * * *